United States Patent
Czapla et al.

(10) Patent No.: US 12,296,975 B2
(45) Date of Patent: May 13, 2025

(54) AIRCRAFT PROPULSIVE ASSEMBLY COMPRISING A NACELLE WITH A T-SHAPED FRAME

(71) Applicant: Airbus Operations SAS, Toulouse (FR)

(72) Inventors: Lionel Czapla, Toulouse (FR); Christophe Labarthe, Toulouse (FR); Kotaro Fukasaku, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/602,498

(22) Filed: Mar. 12, 2024

(65) Prior Publication Data

US 2024/0327023 A1    Oct. 3, 2024

(51) Int. Cl.
| | |
|---|---|
| *B64D 37/30* | (2006.01) |
| *B64D 27/18* | (2006.01) |
| *B64D 29/02* | (2006.01) |
| *F02K 1/36* | (2006.01) |

(52) U.S. Cl.
CPC ............. *B64D 37/30* (2013.01); *B64D 27/18* (2013.01); *B64D 29/02* (2013.01); *F02K 1/36* (2013.01)

(58) Field of Classification Search
CPC ............ B64D 37/30; B64D 29/02; B64C 7/02
See application file for complete search history.

(56) References Cited

U.S. PATENT DOCUMENTS

| | | | |
|---|---|---|---|
| 4,437,627 A | 3/1984 | Moorehead | |
| 5,467,941 A | 11/1995 | Chee | |
| 6,802,479 B2 | 10/2004 | Howe et al. | |
| 2010/0040466 A1 | 2/2010 | Vauchel et al. | |
| 2012/0104162 A1 | 5/2012 | West | |
| 2016/0280381 A1 | 9/2016 | Zameroski et al. | |
| 2017/0370292 A1 | 12/2017 | Beier et al. | |
| 2022/0289396 A1 | 9/2022 | Horde et al. | |
| 2023/0015930 A1 | 1/2023 | Meshkin Fam et al. | |

FOREIGN PATENT DOCUMENTS

| | | |
|---|---|---|
| EP | 0145809 B1 | 11/1987 |
| EP | 2815980 B1 | 1/2016 |
| FR | 3120603 A1 | 9/2022 |
| WO | 2008043903 A2 | 4/2008 |

OTHER PUBLICATIONS

French Search Report for corresponding French Patent Application No. 2302991 dated Sep. 26, 2023.

*Primary Examiner* — Nicholas McFall
*Assistant Examiner* — Eric Acosta
(74) *Attorney, Agent, or Firm* — Greer, Burns & Crain, Ltd.

(57) ABSTRACT

A propulsive assembly comprising a nacelle delimiting an internal volume, a T-shaped frame comprising a first wall fixed to the wing and a second wall that is vertical and that divides the internal volume into two sub-volumes, a dihydrogen consumer device, for each sub-volume, a dihydrogen processing system, a supply line connected between the processing system and the consumer device, and an input line connected between the processing system and a dihydrogen tank. Also an aircraft with a wing and such a propulsive assembly.

5 Claims, 2 Drawing Sheets ically connected to the dihydrogen tank, in which said input line extends partly in the associated sub-volume and partly outside of the associated sub-volume by passing through the first wall.

With such an arrangement, the dispensing of dihydrogen is doubled and a problem on one side of the second wall will not impact the other side.

Advantageously, each processing system is fixed to the frame.

Advantageously, each processing system comprises a pump of which an input is fluidically connected to the corresponding input line, a heat exchanger of which an output is fluidically connected to the corresponding supply line, and an intermediate line which is fluidically connected between an output of the pump and an input of the heat exchanger.

Advantageously, an engine housed in the nacelle comprises an ejection nozzle, and the frame has a sheath secured to the second wall in which the sheath is fitted over the ejection nozzle.

The invention also proposes an aircraft comprising a wing, a dihydrogen tank and a propulsive assembly according to one of the preceding variants, in which the first wall is fixed against the bottom surface of the wing and in which each input line is fluidically connected to the dihydrogen tank.

BRIEF DESCRIPTION OF THE DRAWINGS

The abovementioned features of the invention, and others, will become more clearly apparent on reading the following description of an exemplary embodiment, said description being given in relation to the attached drawings, in which.

DETAILED DESCRIPTION OF THE PREFERRED EMBODIMENTS

Figure 1:
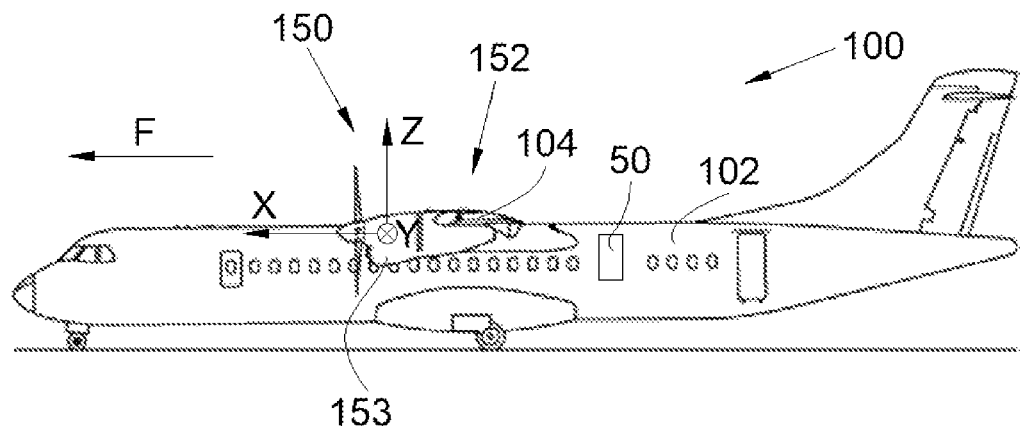
FIG. 1 is a side view of an aircraft according to the invention.

In the following description, the terms relating to a position are taken with reference to an aircraft in a position of advance, that is to say as it is represented in FIG. 1, in which the arrow F represents the direction of advance.

FIG. 1 shows an aircraft 100 which has a fuselage 102 to which is fixed on either side a wing 104 and a tank 50 containing dihydrogen. The aircraft 100 also comprises at least one propulsive assembly 150 which is fixed under the wing 104 and which comprises a nacelle 152 and an engine, in particular a turbojet engine, and which is enclosed in the nacelle 152.

In the following description, and by convention, X denotes the longitudinal direction of the propulsive assembly 150 which is overall horizontal and oriented positively in the direction of advance F of the aircraft 100, Y denotes the transverse direction of the propulsive assembly 150 which is horizontal when the aircraft 100 is on the ground, and Z denotes the vertical direction or vertical height when the aircraft 100 is on the ground, these three directions X, Y and Z being mutually orthogonal.

The terms "front" and "rear" should be considered with respect to the direction of advance F of the aircraft 100 under the effect of the thrust supplied by the engine in operation.

The propulsive assembly 150 has a vertical median plane XZ.

In the embodiment of the invention presented here, the engine is equipped with a propeller which is movable in rotation about an axis parallel to the longitudinal direction X, but, instead, it can be equipped with a fan.

Figure 2:
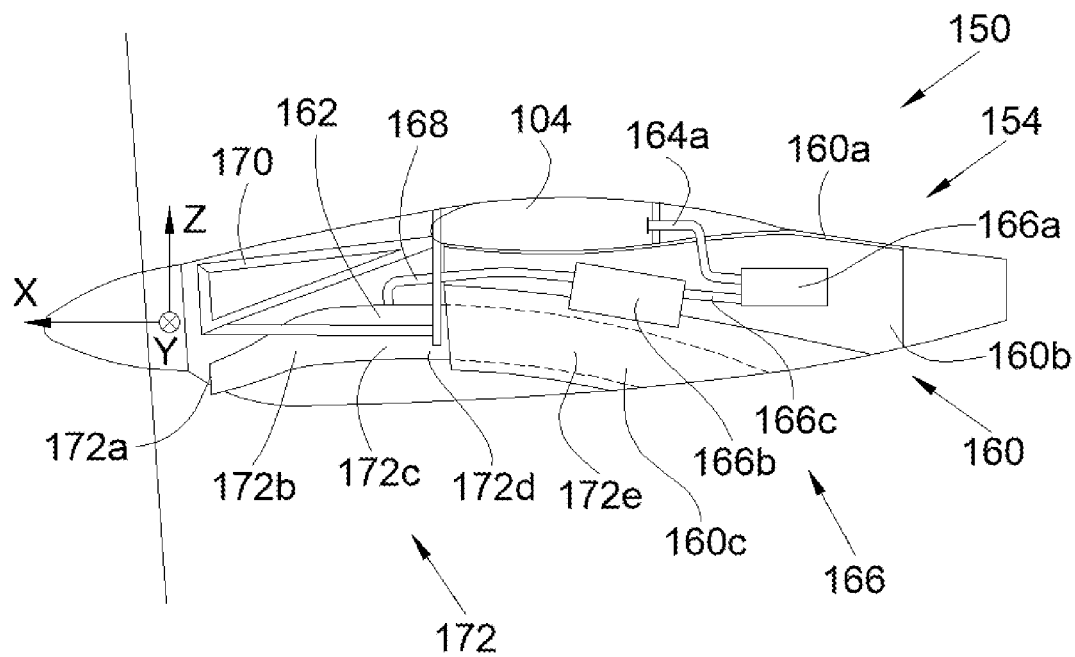
FIG. 2 is a side view without the cowls of a propulsive assembly according to the invention.

FIG. 2 shows the propulsive assembly 150 without the nacelle 152.

The nacelle 152 comprises several cowls 153 which are fixed to an internal structure of the nacelle 152 and which comprises, for example, a front primary structure 170 which is composed here of bars fixed to one another and which are fixed to a structure of the wing 104.

The engine 172 conventionally comprises, from upstream to downstream with respect to the direction of flow of air in the engine 172, an air inlet 172a, a compressor 172b, a combustion chamber 172c, a pressure reducer 172d and an ejection nozzle 172e.

The cowls 153 delimit an internal volume 154 in which is housed the engine 172 and the internal structure while leaving open passages for the air inlet 172a and the ejection nozzle 172e.

Figure 3:
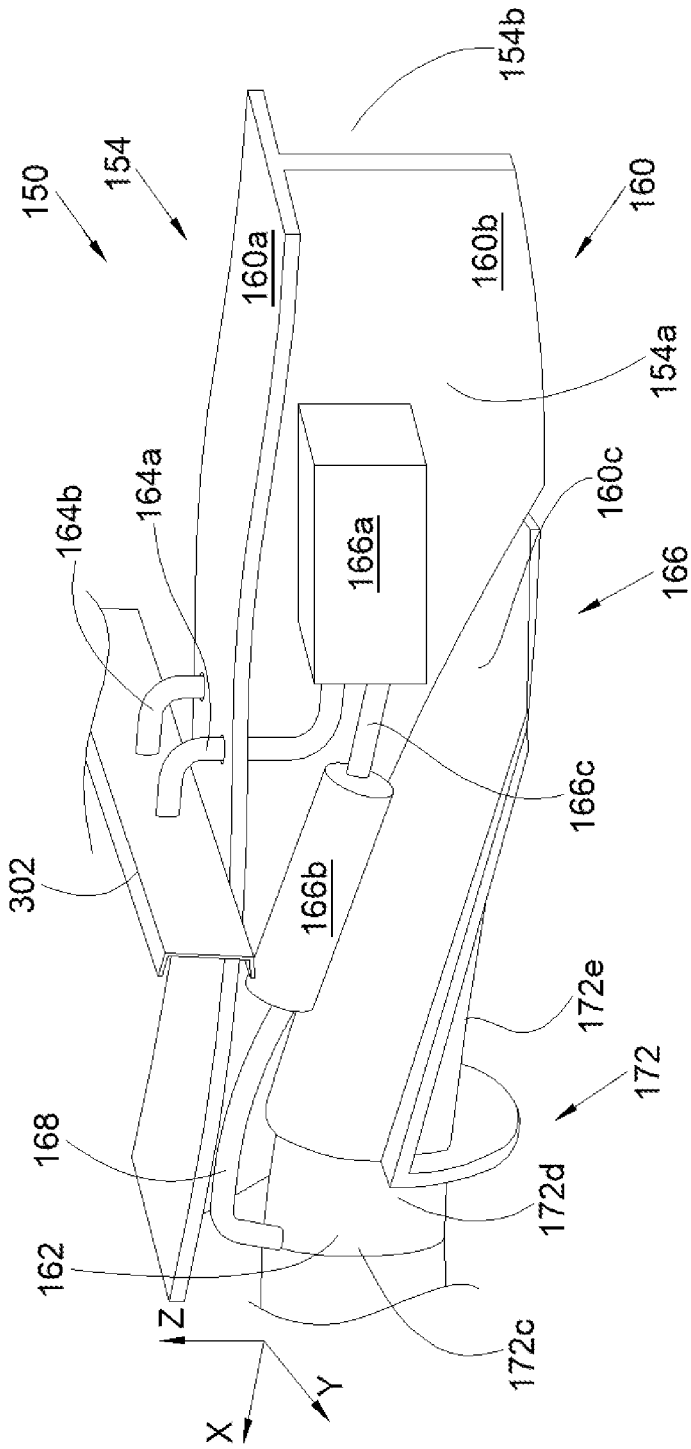
FIG. 3 is a perspective view of a part of the propulsive assembly according to the invention.

FIG. 3 shows a part of the propulsive assembly 150 without the nacelle 152.

The propulsive assembly 150 comprises a frame 160 which is housed in the internal volume 154 and which takes the form of a T-shaped section with a first wall 160a and a second wall 160b secured to the first wall 160a. The T-shaped section extends parallel to the longitudinal direction X.

The first wall 160a extends overall horizontally and is fixed against the bottom surface of the wing 104.

The second wall 160b extends overall vertically under the first wall 160a and substantially in the middle of the first wall 160a to divide the internal volume 154 into two sub-volumes 154a-b, namely a sub-volume 154a on the port side of the second wall 160b and a sub-volume 154b on the starboard side of the second wall 160b. The second wall 160b is overall aligned with the median plane XZ.

The propulsive assembly 150 also comprises a consumer device 162 which, in the embodiment of the invention presented in FIG. 2, is composed of the combustion chamber 172c, but it could take another form such as a fuel cell. The consumer device 162 consumes the dihydrogen from the tank 50.

The consumer device 162 is housed in the internal volume 154.

To ensure a good supply of dihydrogen to the consumer device 162, the propulsive assembly 150 comprises a processing system 166 which processes the dihydrogen. To ensure redundancy in the processing of the dihydrogen, for each sub-volume 154a-b, a processing system 166 is provided that is housed in said sub-volume 154a-b, that is to say that there is a processing system 166 on either side of the second wall 160b.

For each processing system 166, the propulsive assembly 150 comprises a supply line 168 housed in the sub-volume 154a-b corresponding to said processing system 166 and fluidically connected between the processing system 166 and the consumer device 162.

For each sub-volume 154a-b, the propulsive assembly 150 comprises an input line 164a-b fluidically connected to the processing system 166 corresponding to said sub-volume 154a-b and which is fluidically connected to the dihydrogen tank 50. Each input line 164a-b extends partly in the associated sub-volume 154a-b and partly outside of the associated sub-volume 154a-b by passing through the first wall 160a to rejoin the tank 50.

With such an arrangement, in the event of a fault on a supply line between the tank 50 and the consumer device 162 at the nacelle 152, there is a redundancy of the systems linked to the dihydrogen and in the case of fire in one of the sub-volumes 154a-b, the other sub-volume 154b-a is spared by the fact that the frame 160 forms a barrier between the two sub-volumes 154a-b.

The frame 160 is produced in a material that is fire-resistant and resistant to high temperatures, such as metal.

According to a variant embodiment, the fire-resistance is produced by the installation of thermal batting and a protective metal sheet which are fixed to the frame 160. The fire-resistance is then produced by the parts thus added.

The T shape of the frame 160 thus ensures a protection transversely between the two sub-volumes 154a-b and vertically between the propulsive assembly 150 and the wing 104.

According to a particular embodiment, each processing system 166 is fixed onto the frame 160 by any appropriate fixing means, such as bolts.

In the embodiment of the invention presented in FIG. 3, each processing system 166 comprises a pump 166a of which an input is fluidically connected to the corresponding input line 164a-b, a heat exchanger 166b of which an output is fluidically connected to the corresponding supply line 168, and an intermediate line 166c which is fluidically connected between an output of the pump 166a and an input of the heat exchanger 166b.

Such an arrangement makes it possible to take the liquid dihydrogen from the tank 50 and propel it to the consumer device 162 by transforming it into gaseous dihydrogen for a better efficiency in said consumer device 162.

The heat exchanger 166b is moreover supplied with another fluid constituting a source of heat with respect to the dihydrogen. Said other fluid is for example dinitrogen circulating in a closed loop and heated by the engine 172.

In the embodiment of the invention presented in FIG. 3, the pump 166a and the heat exchanger 166b are fixed to the second wall 160b.

According to a particular embodiment, the frame 160 is not fixed directly to the internal structure of the nacelle 152, but it is fixed to the structure of the wing 104 represented in FIG. 3 by a transverse spar 302 which is itself passed through by the input lines 164a-b. The fixing is ensured by any appropriate means, such as bolts.

In the embodiment of the invention presented in FIGS. 2 and 3, the frame 160 has a sheath 160c which is secured to the second wall 160b and which is disposed here at the base of said second wall 160b. The sheath 160c is fitted over the ejection nozzle 172e which ensures the securing of the frame 160.

The sheath 160c is thus open at its two ends to allow the passage of the ejection nozzle 172e and the evacuation of the combustion gases to the outside.

The shape of the sheath 160c is thus matched to the shape of the ejection nozzle 172e.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsive assembly for an aircraft comprising a wing and a dihydrogen tank, said propulsive assembly comprising:
    a nacelle comprising cowls delimiting an internal volume,
    a frame that is T-shaped in cross-section, housed in the internal volume, comprising a first wall configured to be fixed against a bottom surface of the wing, and a second wall extending vertically under the first wall by dividing the internal volume into two sub-volumes when the propulsive assembly is mounted on the aircraft,
    a consumer device housed in the internal volume and configured to consume dihydrogen,
    for each sub-volume, a processing system housed in said sub-volume and intended to process dihydrogen,
    for each processing system, a supply line housed in the associated sub-volume and fluidically connected between the processing system and the consumer device, and
    for each sub-volume, an input line fluidically connected to the associated processing system, configured to be fluidically connected to the dihydrogen tank, in which said input line extends partly in the associated sub-volume and partly outside of the associated sub-volume by passing through the first wall.

2. The propulsive assembly of claim 1, wherein each processing system is fixed to the frame.

3. The propulsive assembly of claim 1, wherein each processing system comprises a pump of which an input is fluidically connected to the corresponding input line, a heat exchanger of which an output is fluidically connected to the corresponding supply line, and an intermediate line which is fluidically connected between an output of the pump and an input of the heat exchanger.

4. The propulsive assembly of claim 1, wherein an engine housed in the nacelle comprises an ejection nozzle, and in that the frame has a sheath secured to the second wall in which the sheath is fitted over the ejection nozzle.

5. An aircraft comprising:
    a wing,
    a dihydrogen tank,
    and the propulsive assembly of claim 1, wherein the first wall is fixed against a bottom surface of the wing, and wherein each input line is fluidically connected to the dihydrogen tank.

* * * * *